United States Patent Office 3,247,048
Patented Apr. 19, 1966

3,247,048
NITROGEN PREPOLYMERS AS WET AND DRY
STRENGTH IMPROVERS FOR PAPER
Van R. Gaertner, Ballwin, Mo., assignor to Monsanto
Company, a corporation of Delaware
No Drawing. Filed Sept. 10, 1962, Ser. No. 222,678
19 Claims. (Cl. 162—164)

This invention relates to prepolymer compositions, to the preparation thereof, and to the uses thereof as polysaccharide treating agents. More particularly, this invention provides organic nitrogen prepolymer compositions which are useful for improving the wet and dry strength, and dimensional stability of cellulosic paper products.

An object of this invention is to provide novel organic nitrogen prepolymers.

Another object of this invention is to provide a method for preparing organic nitrogen prepolymers.

Another object of this invention is to provide polysaccharide materials treated with organic nitrogen prepolymers.

Another object of this invention is to provide methods for improving the wet and dry strengths and dimensional stability properties of paper products.

Other objects of this invention will become apparent from a reading of the following description and the appended claims.

According to one aspect of this invention there is provided a process for preparing prepolymers involving the reaction of (a) an adduct of an epihalohydrin and an amine having at least 1 primary amino nitrogen and an average of from 2 to 8 amino hydrogens per amine molecule, and (b) an amine having at least 2 amino hydrogens. For preparing these prepolymers it is essential that the adduct (a) be the reaction product of at least 2 molar proportions of the epihalohydrin reactant per mole of the amine reactant. The adduct (a), however, must not be a polymerized material but must be essentially a monomeric material so that when it is reacted with amine (b) a prepolymer reaction product is formed. This result may be accomplished at atmospheric pressure by reacting the epihalohydrin and the amine used to form the adduct at a temperature not above 50° C., preferably at 10 to 35° C., although temperatures as low as 0° C. or lower can be used. When the epihalohydrin reacts with the amine reactant, the added epihalohydrin becomes a haloalkanol group of the adduct. The adduct reactant (a) must have at least 2 haloalkanol groups per molecule of amine to which the epihalohydrin was added. At least one of said reactants (a) and (b) is at least trifunctional, that is, either or both of the two reactants (a) and (b) has at least 3 reactive groups. For example, when the adduct (a) is trifunctional, it contains at least 3 haloalkanol groups per molecule of adduct. When the amine (b) is trifunctional such amine has at least 3 reactive amino hydrogens per molecule of amine. For preparing the prepolymer used in this invention, the molar ratio, that is, the molar proportions of said adduct (a) to said amine (b) must be such that the adduct reactant (a) provides at least 3 haloalkanol equivalents, and the adduct reactant (a) and the amine reactant (b) provides at least 3 amino hydrogen equivalents for each combined total of from 6 to 14 haloalkanols and amino hydrogen equivalents.

Another aspect of this invention is to provide water soluble and water dispersible organic nitrogen prepolymer compositions and mineral acid salts of said prepolymers by reacting an adduct (a) with an amine (b) as described above, said prepolymers being additionally characterized by the fact that when they are contacted with an aqueous medium having a pH of about 5 or higher they convert or polymerize to an insoluble cross-linked polymer, that is, the prepolymers polymerize to polymers which are not soluble in water, alcohol, oil or other solvents.

Another aspect of this invention provides polysaccharide materials treated with a minor proportion of the organic nitrogen prepolymer compositions described above, as new compositions of matter.

Another aspect of this invention provides methods for improving the wet and dry strength, and dimensional stability of polysaccharides, in general and cellulosic paper products in particular, by treating said polysaccharide materials by impregnation, spraying, coating, or by other conventional methods with the organic nitrogen prepolymer compositions of this invention.

Another aspect of this invention provides a process for conveniently and efficiently increasing the wet and dry strength and dimensional stability of a cellulosic paper product by incorporating into the aqueous pulp which is to be used to make said paper a minor amount of the ingredients of the prepolymer compositions of this invention, and then forming the resulting treated pulp into paper according to conventional tehniques.

The prepolymers of this invention are specifically adapted for increasing the wet and dry strength and dimensional stability of cellulosic paper products. It has been found according to this invention that for such uses the prepolymer composition should not be derived from amines having hydrophobic groups therein such as long chain alkyl groups, alkenyl groups, alkylaryl groups etc., but should be derived from amines having only hydrogen, or only small short chain groups bonded to said nitrogen atoms.

It has been discovered according to this invention that the wet and dry strength and dimensional stability of cellulosic paper products can be substantially improved by treating said papers or the pulp used to make said papers with a minor amount of the prepolymers of this invention.

The composition which is termed a "prepolymer" is a lower polymeric material which is a polymer precursor, or intermediate, still having a total average of at least three functional units per molecule of prepolymer, i.e., the average total of amino hydrogens and haloalkanol/epoxyalkyl units is at least three. The "haloalkanol" group is derived from the epihalohydrin added to the amine in forming adduct (a), and is the adduct form of such epihalohydrin. Thus, when epichlorohydrin is used, the resulting haloalkanol group is

$$-CH_2CH(OH)CH_2Cl$$

The prepolymer contains halogen as an essential moiety thereof, and such halogen is present in the prepolymer product both as part of a haloalkanol group and as hydrohalide salts of the amine nitrogens. When the hydrohalide salt groups are derived from the haloalkanol groups there remains in place of the haloalkanol group an epoxyalkyl group, but, in such event, the prepolymer still contains the original halogen as "haloalkanol" equivalent. In the embodiments contemplated by me it is desired to keep the prepolymer in such state as a prepolymer until it is applied to a polysaccharide substrate in minor amount, where the prepolymer sets up or polymerizes to an insoluble polymeric material in the medium of the substrate, e.g., in cellulose fibers of pulp used in making paper. The prepolymer product is preferably maintained in solution or suspension in the solvent or diluent used in its preparation, such as in a lower alkanol, preferably methanol, ethanol, or isopropanol.

The adduct starting material (a), which is used in preparing the prepolymer products of this invention, have at least 2 haloalkanol equivalents per mole of amine used in preparing the adduct. When the amine used in preparing the adduct is a diamine, triamine, or other polyamine the adduct preferably contains more than 2 haloalkanol equivalents, and may contain up to, say, 7 or 8 haloalkanol molar equivalents per mole of adduct. I have prepared such adducts by condensing an excess molar amount of an epihalohydrin with the amine used, said molar proportions of epihalohydrin being determined by the number of amino hydrogens in the amine, i.e., the number of hydrogen atoms bonded to amino nitrogen, and then using from about 80–120% of this number of moles of epihalohydrin per mole of polyamine. The adduct is prepared by combining the epihalohydrin and amine in the presence of a non-reactive solvent or diluent, such as the liquid alkane hydrocarbons such as hexane, heptane or, as is preferred in a lower alkanol such as methanol, ethanol, isopropanol, etc., with methanol being especially preferred, at low or ordinary room temperatures at atmospheric pressure. Temperatures of from 0° to 50° C., preferably from 10 to 35° C., for a time sufficient to effect as complete an addition reaction as possible, i.e., until the product adduct has as many haloalkanol groups, derived from the epihalohydrin, as is possibly obtainable in a reasonable time of reaction, but having at least 2 such haloalkanol groups. Time periods vary depending upon the temperature, solvent, molar proportions, reactants, etc., used, but time periods of from one hour to 48 hours are generally sufficient. A preferred set of conditions generally includes the reaction of a 0–25% molar excess of epihalohydrin per mole of amine amino hydrogen equivalent at room temperature and atmospheric pressure for from 4 to 24 hours.

The epihalohydrin used in preparing the adduct starting material is preferably epichlorohydrin but may be epibromohydrin, epiiodohydrin or one of the higher molecular weight/vicinal epihalohydrins such as 3-chloro-1,2-epoxybutane, 3-chloro-1,2-epoxypentane, etc.

The amine used in preparing the adduct (a) and the amine reactant (b) has at least one primary nitrogen atom and may contain one or more secondary amino nitrogen atoms. Useful amines include aliphatic monoamines, diamines, and polyamines having up to about 6 amino nitrogens, and 8 amino hydrogens. Preferred amines have a formula selected from the group consisting of (I)

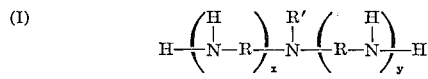

and (II)

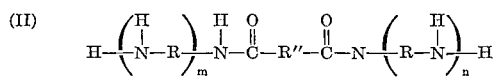

wherein each R denotes a bivalent saturated alkylene group having from 2 to 6 carbon atoms, R' is hydrogen a lower alkyl radical having up to 6 carbon atoms, inclusive or a lower alkyl acyl radical having up to 6 carbon atoms; each of $x$ and $y$ are integers of from 0 to 6, $x$ plus $y$ equals 1 to 6, R'' is a bivalent alkylene radical of from 2 to 8 carbon atoms, each of $m$ and $n$ are integers of at least 1, and $m$ plus $n$ equals from 2 to 4. The amine used in preparing the adduct reactant (a) may be (I) or (II) above and the amine reactant (b) can be of either type (I) or (II) above. For example, an adduct of triethylenetetramine (I) and 5 epichlorohydrin can be reacted with diethylenetriamine (I) to obtain a prepolymer composition. Similarly an adduct of epibromohydrin and dipropylenetriamine (I) with an amidoamine prepared by condensing ethylenediamine with adipic acid (II) can be used. Other examples include the use of an adduct of epichlorohydrin and an amido amine of hexanedioic acid (II) and tetraethylenepentamine (I), and the mineral acid salt of an adduct of epichlorohydrin with tributylenetetramine and diethylenetriamine. The amines having a total of 12 carbon atoms or less are preferred.

In preparing the prepolymers of this invention the adduct reactant (a) can be used as freshly prepared or may be allowed to "age" or cure by standing for some time or can be heated for a short time to accelerate the aging process before it is reacted with the amine reactant (b) to prepare the prepolymer.

Amine compounds that may be used in the process of this invention are those having at least 2 and up to about 7 or 8 amino hydrogens per molecule and include ammonia, lower alkyl primary monoamines such as methylamine, ethylamine, isopropylamine, mixed amylamines, hexylamines, as well as the alkylenediamines, triamines, and polyamines, such as ethylenediamine, propylenediamine, butylenediamine, hexylenediamine, diethylenetriamine, dipropylenetriamine, dipentylenetriamine, triethylenetetramine, tributylenetetramine, trihexylenetetramine, tetraethylenepentamine, tetrapropylenepentamine, pentaethylenehexamine, pentapropylenehexamine, N-ethyl-1,2-ethylenediamine, N-propyl-1,3-propylenediamine, N-hexyl-1,4-butylenediamine, N-butyltriethylenetetramine, N-hexyltripropylenetetramine, and N-pentyltetrabutylenepentamine.

Amido-amine compounds that are the condensation product of lower alkanoic acids and amines may also be used. A few examples are those resulting from the condensation of acetic acid, propionic acid, butanoic acid, pentanoic acid, hexanoic acid, or heptanoic acid with an aliphatic alkylenediamine, triamine, polyamine as described above.

An important class of amido amines useful for the purposes of this invention are those resulting from the condensation of alkanedioic acids having up to 10 carbon atoms therein with an alkylenediamine, triamine, or polyamine as described above. The acids such as succinic acid, glutaric acids, adipic acids, sebacic acids etc., may be condensed with sufficient alkylenediamine, triamine, or polyamine to provide from 2 to 6 amino nitrogen atoms. The amido nitrogen atoms and the hydrogens bonded thereto are not counted in determining the maximum extent of epihalohydrin reaction, since no epihalohydrin will add to such amido nitrogen atoms under my conditions. Synthetic mixtures of di-, tri-, and higher polyamines may also be used, for example, amine products prepared by reductively aminating a low copolymer of ethylene and carbon monoxide, hydrogenating a lower molecular weight polyacrylonitrile, condensing a lower polyamine with epichlorohydrin in presence of alkali, or polymerizing an alkyleneimine.

In preparing the adduct reactant (a), sufficient epihalohydrin, generally an excess, is used to form as completely as possible an adduct wherein all the amino hydrogens are replaced with haloalkanol groups. However, as a practical matter it is generally quite difficult to obtain complete replacement of all such secondary amino hydrogen atoms with haloalkanol groups. Satisfactory products are obtained for polysaccharide treatment purposes when say, at least from 25 to 50% of the available secondary amino hydrogens are replaced with haloalkanol groups.

The reaction between the amine and the epihalohydrin is conducted in the presence of at least a trace amount of an hydroxy-containing material, preferably a low molecular weight, volatile alkanol, such as methanol, ethanol or propanol, most preferably methanol, which can be used as solvent or diluent for the reaction mixture as well as the catalyst. The hydroxy-containing material needed to start the reaction can be supplied in a variety of ways. For example, the small amount of water normally present in some commercially available solvents, such as hexane, heptane, etc., is sufficient to initiate the reaction. However, water is not generally desired as a solvent for this reaction. The hydroxyl-containing material can also be supplied by some of the reaction product, that is, the adduct itself, since such adduct contains hydroxyl groups. The hydroxyl-containing material can also be any other hydroxyl compound, a few examples of which are phenol, alkylene glycols such as ethylene glycol, propylene glycol, etc. The provision of the hydroxyl-containing material to initiate the reaction is critical in the sense that in its absence the reaction between the epihalohydrin and the amine does not take place. For example, attempts to conduct the reaction using dry hexane as solvent resulted in no adduct being formed. However, for most purposes the small amount of hydroxyl-containing material needed to initiate the reaction can be supplied by any source such as are indicated above with no other requirements as to type, amount, etc., being critical.

The reaction is conducted at low temperatures, generally, on the order of 0° C. to 50° C. at atmospheric pressure, with temperatures of from 10°–35° C. being preferred. Time periods ranging from 1 to 100 hours are generally sufficient to afford time for a complete as possible addition of haloalkanol groups (from the epihalohydrin) to the amino nitrogen atoms. Specific time periods within this range can be optimized by those skilled in the art and will vary depending upon the reactants chosen, the solvent, the molar proportions, the temperature used, etc. When the reaction is completed any excess epihalohydrin together with most of the diluent or solvent is removed at low temperatures, not above 50° C., from the adduct obtained, preferably by distilling or flashing off of said materials under reduced pressure. It is not essential to remove all of any diluent or solvent but is preferred to remove substantially all of the excess epihalohydrin. Some additional aspects of preparing said adducts are disclosed in applicant's copending application, S.N. 212,438, filed July 25, 1962, which is incorporated herein by reference.

The reaction product of the adduct (a) and the amine (b) is a prepolymer, i.e., it is a low polymeric functional material still containing reactive haloalkanol groups, glycidyl groups, amino hydrogen groups, and amine hydrohalide salt groups. The amine hydrohalide salt groups are not removed from the prepolymer until further polymerization is desired, e.g., in the cellulosic matrix of paper products. The retained hydrohalide salt groups serve to limit the extent of reaction in the prepolymer and to make said prepolymer water soluble or at least water dispersible. In fact, when higher polyamines are used as the amine reactant in preparing the adduct it may be desirable to add additional hydrogen halide acid, or any suitable mineral acid such as sulfuric acid, phosphoric acid, nitric acid, etc., to enhance this effect of polymerization limitation. When said prepolymer product is contacted with an aqueous medium, say at about a pH 5 up to about pH 13, preferably at pH 6 to 11, the hydrohalide salt groups are removed and polymerization proceeds to form an insoluble cross-linked polymer. This invention thus provides products which inherently limit the degree of polymerization. To form said prepolymer it is essential that an adduct of an epihalohydrin and an amine be used. The amine used must contain at least one primary amino nitrogen, i.e., an amino nitrogen having two hydrogens bonded thereto. Said amine may contain one or more secondary and/or tertiary nitrogen atoms. Simple secondary amines, i.e., those having only one hydrogen bonded to a nitrogen atom may not be used, since with such amines no prepolymer is formed. The adduct must contain at least 2 haloalkanol groups per molecule of amine used, i.e., a mole of amine used to prepare said adduct, reacts with and takes up at least 2 moles of the epihalohydrin used. In preparing said adduct, which is essential to prepolymer formation, the temperature is kept below 50° C., as indicated above, to promote adduct formation, and to minimize any competing deleterious reactions which occur if higher temperatures are used. For example, at higher temperatures greater amounts of disproportionation reactions occur causing formation of by-products, such as dichlorohydrin (1,3-dichloro-2-propanol) when epichlorohydrin is used, and complex mixtures of partially and completely polymerized materials.

The adduct used for reaction with the amine reactant (b) to prepare the prepolymer product may be "fresh" adduct or "aged" adduct. The "fresh" adduct is one which analyzes as having as near to the theoretical number of haloalkanol groups as possible. As a practical matter, however, since the adduct contains basic nitrogen and active haloalkanol groups, the basic nitrogen tends to abstract hydrogen halide from said haloalkanol groups, resulting in the formation of glycidyl groups from the remaining haloalkanol group and the hydrohalide salts of the basic nitrogen. An "aged" adduct is one with a measurable amount of its amino nitrogens neutralized with the hydrohalide groups derived from the haloalkanol groups and a portion of the resulting glycidyl groups condensed with secondary amino nitrogens present in the adduct.

The "neutralization equivalent" (N.E.) used in this work is a measure of the hydrohalide transfer plus the degree of dimerization or polymerization of the adduct and is expressed by the following equation:

$$\text{N.E.} = \frac{\text{Mg. of sample}}{\text{Me. of acid required for neutralization}}$$

The number of milliequivalents (me.) is obtained by multiplying the volume by the normality of the standard reagent required for neutralization to the crystal violet end-point. When a sample of adduct is titrated with standard hydrogen bromide in glacial acetic acid reagent the total me. of reagent used measures the basic nitrogens not neutralized by hydrogen halide in the sample plus the me. of oxirane oxygens in the sample. Therefore, a "fresh" sample in which little hydrogen halide transfer has taken place would have a "neutralization equivalent" close to theory (lower N.E.) and would require more me. of standard reagent. An adduct which has "aged" somewhat by hydrogen halide transfer and condensation would require fewer milliequivalents of standard reagent and therefore, have a higher "neutralization equivalent."

The "titer" of the prepolymer product is a measure of the amount of basic nitrogen which has been neutralized by transferring hydrohalide groups (over and above the amount of hydrogen halide transfer which occurred during the aging of the adduct) plus the reaction of resulting oxiranes with amino groups. It is expressed in terms of number of milliequivalents per gram of prepolymer. For example, a prepolymer which is said to have 90% of its original titer is one in which 10% of the basic nitrogens of the prepolymer are neutralized by transferred hydrohalide groups, and a corresponding number of glycidyl groups condensed with amino groups. Similarly, a prepolymer having 79% of its original titer is one in which 21% of the basic nitrogen therein has been so neutralized and glycidyls condensed. This titer measurement is also a fair indication of the degree of dimerization and polymerization which has occurred between the adduct and the added amine, that is, in the prepolymer, since the glycidyl groups generated by hydrogen halide transfer react with the added amine. That is, both reactions must occur to result in a decrease in titer.

The above requirements are consistent with the theory of gelation or cross-linking of polymers described by W. H. Carothers (H. Mark and G. S. Whitby, editors, "Collected Papers of W. H. Carothers on High Polymeric Substances," Interscience Publishers, Inc., New York, 1940). The critical degree of reaction ($P_c$) for gelation is related according to Carothers to the average functionality ($f$) by the equation:

$$P_c = \frac{2}{f}$$

The average functionality is defined as the total equivalents of reaction sites divided by the total number of moles of both monomers used. Thus, if two moles of a tri-functional monomer and three moles of a complementary or co-reacting bi-functional monomer are taken, the average functionality is:

$$f = \frac{2 \times 3 + 3 \times 2}{2 + 3} = \frac{6+6}{5} = \frac{12}{5} = 2.4$$

Then the degree of reaction to obtain gelation is $$P_c = \frac{2}{2.4} = .83$$

That is, 83% reaction produces gelation to an insoluble cross-linked polymer. Furthermore, cross-linking of complementary monomers occurs only if at least one of the complementary monomers has more than two reactive sites, according to Carothers. If the reaction is highly efficient, the functionality may consist of equal proportions of the two complementary reaction sites. If a monomer may undergo side reactions, i.e., reactions which do not contribute to polymerization, e.g., cyclization, intramolecularly, proportionately more of such a monomer must be utilized.

The above amine-halohydrin adducts are relatively inefficient and depending on the adduct and on the added amine and their reactivity, the efficiency may vary from about 50% to about 80%; thus up to a 100% functional excess of adduct is required to react completely with the added amine. Complete reaction is nearly impossible to achieve because once gelatin begins, the reactive sites are not completely mobile and may not approach complementary sites.

An advantage of the prepolymers of this invention is that they are soluble or dispersible in aqueous systems and are therefore easily applied to paper products. However, sufficient functionality must be provided to produce gelation or insoluble polymer formation under the relatively mild curing conditions available to the papermaker, while maintaining a soluble low molecular weight form until use. In general, the minimum degree of reaction for gelation, the critical value $P_c$, will be in the range 40–80%. Since one monomer must be tri-functional and the other at least di-functional and equal equivalents of the two are involved in the reaction the minimum functionality is $$f = \frac{3 \times 1 + 2 \times 1.5}{1 + 1.5} = \frac{3+3}{2.5} = 2.4$$

then $$P_c = \frac{2}{2.4} = .83$$

or 83%, the maximum practically useful degree of reaction.

Since efficiency of the adducts is rarely above 80%, in practice the value of $f$ must be increased to $$f = \frac{2.4}{.8} = 3.0$$

The use of haloalkanolamines provides a self-limiting prepolymer synthesis within the ranges required. That is, the haloalkanols do not themselves copolymerize with the added amines under the conditions employed. Nor do amine hydrohalides react readily with glycidyl groups. However, glycidyl groups readily condense with primary and secondary amines. Thus as hydrogen halide transfers to basic nitrogen, glycidyl groups are generated and condense with free primary and secondary amino groups. However, the process is self-limiting in that, as it proceeds, fewer basic nitrogens and also fewer unchanged haloalkanolamine groups remain. Also some dissociation of the amine hydrohalides occurs, establishing an "equilibrium" point beyond which the polymerization does not proceed under a given set of conditions. As long as this degree of reaction is less than the critical degree, $P_c$, as calculated by the method outlined above, gelatin will not occur and the product is a stable prepolymer which may be prepared and kept dissolved or dispersed in water or other solvents such as alcohols.

It is clear that the hydrogen halide is the critical component in preventing premature gelation. It is only necessary to neutralize or hydrolyze the hydrohalide salts in order to allow the reaction to proceed to and beyond the critical degree and give an insoluble cross-linked or gelled polymer if the functionality has been chosen as outlined above.

Conversely if higher functionalities ($f$) are employed it may be necessary to add hydrogen halide or other acids to the adduct or amine in order to control the reaction, that is, to prevent gelation, by further limiting the degree of reaction. For instance, an average functionality ($f$) of 5 leads to $$P_c = \frac{2}{5} = .4$$

or only 40% reaction. An example is the reaction of the adduct of diethylenetriamine with 5 epichlorohydrin being condensed with an equimolar quantity of diethylenetriamine. Both are pentafunctional or the average functionality:

$$f = \frac{5+5}{1+1} = \frac{10}{2} = 5$$

In this and similar cases gelation occurs readily under usual conditions of prepolymer synthesis and prior addition of hydrogen chloride to the adduct may be desirable to permit preparation of a more stable prepolymer for some applications such as wet and dry-strength agents for paper.

As the compositions are most useful in the liquid state, it is desirable to obtain prepolymer compositions which are liquid in nature, per se and in solution. It is preferred that the degree of reaction between the adduct and the amine reactants be limited to a fairly low figure until it is desired to allow polymerization to proceed to form an insoluble cross-linked get in the matrix of the substrate to which they are added as modifying agents, e.g., as when the prepolymers are added and mixed with aqueous paper pulp suspensions before the paper is made. The degree of reaction is determined by the functionality of the chosen adduct and amine reactants. In general it is preferred to keep the degree of reaction required for gelation above about 30%, preferably about 40% to 80%. This is accomplished, according to this invention by choosing adduct and amine reactant combinations so as to keep the functionality ($f$) of the reaction mixture low, say, below about 6 or 7 but the functionality of the mixture should be at least about 2.5 so that gelation will occur as desired at less than 100% reaction between the adduct and amine reactants.

In preparing the prepolymer compositions of this intion the adduct (a) either freshly prepared or aged as described above, is combined with the amine reactant (b), preferably in the presence of a solvent such as hexane, heptane, ethanol and isopropanol, but preferably methanol, which dissolves both the adduct and the added amine. The reactants (a) and (b) can be admixed in a variety of ways. The adduct may be added to the amine, either directly or in solution; it is preferred, however, to add the amine, directly or in solution, to a solution of the adduct.

When the adduct (a) and amine reactant (b) are admixed, the resulting mixture can be allowed to stand, but is preferably stirred, at 20° C.–80° C. for from 0.5 to 100 hours, the specific temperature and time being dependent upon the reactants chosen and the necessity of preventing any substantial amount of gelation of the resulting prepolymer product.

The prepolymer product thus obtained does not have to be separated from the solvent used for its preparation before it is applied to polysaccharide material. However, if large excesses of solvent have been used, for economic reasons any amount of solvent in excess of the amount desired can be distilled to leave as product, a prepolymer in solution, e.g., of from 20 to 80% by weight concentration.

As stated above, the prepolymer compositions of this invention are particularly valuable as wet and dry strength improvers for starch and cellulose-base products. A particular advantage of the prepolymer compositions of this invention is that the adduct (a) and the amine reactant (b) may be added separately to the substrate such as starch or paper pulp and then admix them in such mediums. It is preferred, however, to prepare the prepolymer in solution as indicated above, and then use the prepolymer solution for starch or cellulose based product treating purposes. These prepolymers may be used for improving the wet and dry strength and dimensional stability or raw natural cellulose materials such as cotton and various textile materials including cellulose containing filaments, fibers, yarns and fabrics. Other substrates which may be treated with the prepolymer compositions of this invention are natural and synthetic fibers and fabrics such as wool, polyamide, polyimide, polyester materials as well as inorganic fibers and fabrics such as glass, etc.

When the prepolymer compositions of this invention are applied to cellulosic paper products of various types conventional techniques known to those skilled in the art may be used. The prepolymers may be applied to the finished paper stock directly, in solution, or as an emulsion, or in otherwise dispersed form. However, for best results it is preferred to add the prepolymer product to the aqueous cellulosic paper pulp stock in solution in amount sufficient to give the desired amount of wet and dry strength characteristics, for example, from 0.2 to 2% (although, concentration by weight ranging from 0.01 to 5% based on the weight of the dry pulp can be used) before the said pulp is formed into paper sheets, board, etc., and then to form the paper from the thus treated pulp.

A variety of pulps may be treated with the prepolymer compositions, or the ingredients, described above, and used to make the permanently treated paper according to this invention including bleached and unbleached sulfite pulp, bleached and unbleached kraft-pulp, soda pulp, hardwood pulp, and mixtures of ground wood pulp with unbleached kraft pulp and other pulp.

The compositions may be applied to textile materials in various ways so long as impregnation of the textile materials is obtained. For example, the textile materials may be dipped or immersed in the composition or the composition may be dripped or sprayed on the textile materials until the textile material is wetted out with the composition. In order to facilitate the control of the application of the prepolymer of this invention on the textile materials and reduce the drying time, it is desirable to extract the textile material to remove excess solution therefrom. This is suitably accomplished by padding, ringing, squeezing, or hydro-extracting the textile material. The amount of the prepolymer applied to the textile material is controlled by the degree of extraction used and/or the concentration of these materials in the solution, and may be varied widely, depending upon the amount of crease resistance desired in the textile material. In general, the amount of such ingredients applied is between 0.05 and 5% by weight, based on the dry textile material, but good practical wet and dry crease recovery are obtained on most textiles by applying from about 0.2 to 2% by weight, based on the dry textile material.

After the compounds have been applied, in solution, the textile material may then be dried at normal drying temperatures and finally heated to elevated temperatures of about 150 to 300° F. to obtain a crease resistant finish on the textile material. The temperature may be higher than 300° F., depending upon the particular textile material, the type and amount of catalyst and the duration of heating is limited only by the stability of the textile material. The duration of heating may vary widely depending primarily upon the liquid content and the temperature used that is generally between about 1 and 15 minutes with the longer time corresponding to the lower temperatures. The textile material thus obtained may be given the usual finishing operations such as a refinish wash to remove water-soluble materials, steam framing, and the like. Such operations may be desirable but are not essential. After the textile material has been dried of excess solution the compounds may be allowed to cure at room temperature with no added heating step required.

A large variety of textile materials comprising cellulose fibers may be treated in accordance with the processes of this invention. The textile materials treated may be woven or knitted fabrics referred to generally as fabrics or yarns, filaments, or fibers but it is preferred to treat fabrics. The cellulose fibers may be natural cellulose fibers such as cotton, linen, flax, or ramie fibers, or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon. However, non-cellulosic fibers such as wool, glass, synthetic fibers, and the like may also be treated.

The compounds described above are incorporated into textile substrates in various manners, usually in the form of organic solutions or aqueous solutions or suspensions which are prepared according to techniques known in the art. These solutions may contain one or more of various types of cationic, anionic, or non-ionic wetting agents which are known in the art. The solutions of the above compounds may also contain other paper making or textile ancillaries such as stiffening or bodying agents, softening agents, curing agents, and high foaming agents, and the like but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkylene acrylates, polyalkyl methacrylates, vinyl chloride, vinyl acetate copolymers and the like and/or water soluble thermoplastic resins such as polyvinyl alcohols; water-soluble partially hydrolyzed polyvinyl acetates, water soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers or the like; generally such agents are employed in amount of about 0.05 to 5% by weight of the composition.

As examples of wetting agents which may be used may be mentioned sodium salts of alkylated benzene sulfonates such as sodium decyl benzene sulfonate, sodium dodecylbenzene sulfonate, sodium lauryl sulfate, the sodium salt of methyl stearamide ethionic acid, dioctyl sodium sulfoscuccinate, and the like. In general, such agents are employed in amount of about 0.5 to 3%.

As examples of anti-foaming agents which may be used if desired may be mentioned water-insoluble silicone compounds, water-insoluble oils, water-insoluble alcohols and the like. The amount of such agent used varies with its effectiveness in minimizing foaming, but in general, amounts of about 0.1 to 5% by weight of the composition may be employed.

The invention is further illustrated by the following examples:

*Example 1*

An adduct of diethylenetriamine with five equivalents of epichlorohydrin was prepared by treating a solution of 51.6 g. (0.50 mole) of diethylenetriamine in 200 g. of methanol, cooled to 15° C. in a water bath and stirred under calcium sulfate-filled drying tubes, with 254.7 g. (2.75 moles) of epichlorohydrin at once. After immediately removing 1.00 ml. for analysis by the Durbetaki titration, the temperature was controlled below 20° C. by adding ice to the bath in the early exothermic stages, then allowing it to rise to 25° during 90 minutes.

After 21 hours, analysis of a sample indicated that 89.2% reaction had occurred based on 5 moles of epichlorohydrin per mole of amine as 100%. The methanol and excess epichlorohydrin were removed under vacuum by distillation, keeping the temperature of the residue below 30°, finally at less than 1 mm., leaving 274.8 g. of clear yellow very viscous adduct. The weight gain corresponded to 97% of that expected for 5:1 adduct, some reaction having occurred during isolation. The neutralization equivalent was 199, compared to N.E.=189, the theoretical value, indicating a minor extent of hydrogen chloride transfer under even these mild conditions.

Most of the adduct was dissolved in methanol to give a solution, 51.7% by weight, which was refrigerated until used to delay further change.

The above solution, 21.5 g. containing 11.1 g. (0.020 mole) of the adduct with N.E.=246, when used (that is, the N.E. had increased since preparation from 199 to 246, or 124% of the initial N.E. and 130% of the theoretical 189), was treated with 2.06 g. (0.020 mole) of diethylenetriamine, and the mixture was diluted to 30 g. with methanol at room temperature. A 1 ml. sample required 7.05 ml. of 0.532 N hydrogen bromide in acetic acid to the crystal violet end-point.

After stirring 19 hours at 25–28°, 90.7% of the initial titer remained. The mixture was heated and stirred at 64° for 3 hours, cooled and a sample had 64.5% of the initial titer. This very viscous prepolymer solution was completely soluble in both water and acetic acid, and the aqueous solution appeared to be homogeneous and did not separate or settle. It was applied to an aqueous bleached Gatineau pulp slurry at the rate of 2.5% by weight based on the dry pulp. The pulp was formed into handsheets on the Noble and Wood machine in the usual way. The handsheets had no sizing (0 sec.).

The off-machine treated handsheets had an average dry tensile strength of 22.8 lbs./inch compared to 17.5 lbs./inch for untreated waterleaf (control) from the same batch of pulp. The treated sheets were thoroughly soaked in water and tested wet, having an average tensile of 5.33 lbs./inch, compared to 0.35 lb./inch for the untreated waterleaf. These data indicated a 30% improvement in dry strength for the treated sheet and a wet strength which is 23.4% that of the improved dry sheet or 30.5% of the untreated dry sheet, compared to 2% found for the untreated sheet. Further heating of the treated paper resulted in additional improvement in these data.

This viscous prepolymer solution on further curing (standing overnight at room temperature) became a pituitous gel which appeared to dissolve in water but closer examination showed it to be present as hydrated translucent aggregates which settled to a jelly-like layer.

Still further curing (4 days at room temperature) gave a stiff friable gel which was insoluble in both water (swelled) and acetic acid.

Although not representing optimum practical results the above behavior illustrates the typical effect of high functionality, $$\left(f = \frac{5+5}{1+1} = 5 \quad P_c = \frac{2}{5} = .4\right)$$

in which a low critical degree of reaction leads to sudden gelation, following a rapid increase in viscosity. Analysis of the pituitous gel indicated 57.3% of initial titer (a minimum value since only partial solution of the semi-gel was possible); no analysis could be obtained on the friable gel due to its insolubility.

*Example 2*

This example illustrates the stabilizing effect on prepolymer formation of adding aqueous acid to the adduct reactant prior to the addition of the amine reactant.

To 21.5 g. of a 51.7% methanol solution containing 11.1 g. of an adduct of diethylenetriamine and 5 epichlorohydrin (N.E., 246), there was added 1.92 g. (0.02 mole) of a 37–38% by weight reagent aqueous hydrochloric acid. The mixture was stirred and then 2.06 g. (0.02 mole) of diethylenetriamine added. The mixture was stirred, diluted to 30 g. by adding methanol, and stirred again. After sampling the mixture, the remainder was warmed to reflux (65° C.) and heated at 65°–68° C. for 2 hours. At the end of this time, the prepolymer had 71.2% of its initial titer, by Durbetaki titration), indicating a decrease of 28.8% due to reaction between the adduct and amine reactants.

(A) A 15 g. portion of the reaction mixture (a 46.3% solution of prepolymer in methanol) was bottled.

(B) A 10.0 g. portion was diluted with 10 g. of water and bottled.

Thirty-five days later (A) had gelled badly; (B) was still fluid with no sign of gel.

When tested for wet and dry strength effectiveness on paper according to a standard "wet end" method, sample B, above, i.e., a prepolymer of (a) an adduct of diethylenetriamine and 5 epichlorohydrin monohydrochloride and (b) diethylenetriamine in a 1:1 ratio of (a) to (b) gave the following results:

| Sample | Tensile (lbs./inch) | | | |
|---|---|---|---|---|
| | "Off Machine" | | Cured 1 hr., 105° C. | |
| | Dry | Wet | Dry | Wet |
| Control (Untreated) | 14.6 | 0.42 | 14.0 | 0.35 |
| Paper treated with 1% of prepolymer solids based on dry fiber weight | 17.7 | 2.41 | 19.1 | 4.12 |

Thus the treated sample "off the machine" in dry form had 121% of the dry control strength under the same conditions. The wet treated "off machine" sample retained 14% of the dry strength of the treated paper. The cured dry treated paper had 136% of the strength of the control dry cured paper. The wet, cured treated paper retained 22% of the dry cured strength of the treated paper.

*Example 3*

An adduct was prepared by mixing 73.1 g. of adipic acid with 310 g. of diethylenetriamine in xylene. The mixture was heated at a pot temperature of 155–172° C. to distill off a water-xylene azeotrope. Heating and distillation were discontinued after 4.25 hours during which time 52 ml. of aqueous lower layer had been collected. The mixture was cooled overnight, and then aspirated to 175° C./20 mm. and finally to 1 mm. to remove first the xylene and then the excess diethylenetriamine, leaving 114.8 g. of an adipolydiethylenetriamine having a neutralization equivalent of 101.4.

To 21.5 g. of a 51.7% solution of adduct of diethylenetriamine+5 epichlorohydrin monohydrochloride in methanol (containing 11.1 g. of the adduct) there was added 8.12 g. of the above adipolydiethylenetriamine. Methanol was added to bring the total weight to 40 g. The mixture was stirred and heated to 65° C. during which time the prepolymer mixture set to a dry friable gel.

A 27.2 g. methanol-adduct solution of which 12.2 g. was adduct of triethylenetetramine and 5 epichlorohydrin was treated with 4.0 g. of concentrated hydrochloric acid to make the dihydrochloride salt of the adduct. This solution was then treated with 8.1 g. of the above adipolydiethylenetriamine. Methanol was added to bring the total weight to 50 g. The mixture was stirred for 2 hours at 68° C. (reflux) during which time the reaction mixture polymerized to a firm gel.

*Example 4*

To 43.1 g. dihexylenetriamine in 100 g. of methanol there was added 92.5 g. (1:5 ratio of amine to epichlorohydrin) at 20°–25° C. The mixture was stirred to homogeneity, sampled, and stirred for 21 hours during which time the temperature rose to 35° C. At the end of this time, analysis showed 104.7% of the theoretical neutralization equivalent for the desired adduct of dihexylenetriamine+5 epichlorohydrin. It was refrigerated as the 57.3% solution of adduct in methanol.

To a 23.6 g. portion of the above cooled adduct solution, there was added 4.0 g. of concentrated hydrochloric acid. The mixture was stirred and then treated with 4.3 g. of dihexylenetriamine. The mixture was stirred, sampled, and heated to reflux for 1 hour. Then the mixture was quickly diluted to twice its weight with water. Samples of the diluted product had 47.2% of the initial titer after correction for dilution. The prepolymer was obtained as a 31.9% solution in aqueous methanol.

Another sample of prepolymer prepared using the monohydrochloride salt of an adduct of dihexylenetriamine+5 epichlorohydrin and dihexylenetriamine in a 1:1 molar ratio of adduct to amine thickened to a rubbery gel within 20 minutes at 70° C.

By repeating the above reaction between 27.2 g. of a methanol-adduct solution of 12.2 g. of triethylenetetramine and 5 epichlorohydrin using 6.0 g. of 37–38% hydrochloric acid to form the trihydrochloride salt and 8.1 g. of the above adipolydiethylenetriamine at reflux, there was obtained a liquid 54.5% prepolymer solution in methanol which did not gel. A 10.3 g. portion of this prepolymer solution gelled upon standing less than one week. A 6.4 g. portion of this prepolymer solution was diluted with 6.4 g. of water to give a 27.2% solution of prepolymer. This portion remained completely water soluble.

*Example 5*

An adduct was first prepared as follows:

To 58.5 g. (0.400 mole) of triethylenetetramine in 300 g. of methanol, cooled to 25° C., there was added at once 185.1 g. (2.0 moles) of epichlorohydrin. The resulting mixture was stirred, sampled immediately and kept below 25° C. with ice bath cooling. After 30 minutes ice cooling was discontinued but water bath cooling was retained. The mixture was stirred for a total 23.75 hours during which time the mixture was sampled and analyzed to determine the degree of addition of epichlorohydrin to the tetramine. After this time the product analyzed as containing 97% of added epichlorohydrin for a triethylenetetramine+5 epichlorohydrin adduct. The adduct, as a 44.7% solution in methanol, was refrigerated to stop further reaction.

A 54.4 g. portion of the triethylenetetramine+5 epichlorohydrin adduct in methanol solution containing 24.3 g. of the adduct, prepared as above, was treated with 7.9 g. of 37–38% hydrochloric acid. The mixture was stirred and then treated with 5.84 g. of triethylenetetramine. The mixture of the triethylenetetramine+5 epichlorohydrin dihydrochloride and triethylenetetramine (an adduct to amine ratio of 1:1 on a molar basis) was stirred at 67° C. for 2 hours. Analysis showed a 30% decrease in titer. The heating and stirring were discontinued. Upon standing overnight, the titer had decreased another 3%. The resulting prepolymer solution (48.5% in methanol) was a solution which was stored at room conditions. After it was found to have gelled to a soft jelly-like material. It was applied to pulp in a manner similar to that described in Example 1. When the treated pulp (2.5% by weight prepolymer based on the dry fiber) was formed into handsheets, the following properties were observed: dry tensile, 16.5 lbs./inch (120% of dry control), and wet 3.86 lbs. (23% of dry treated sheet), both off-machine. After curing these sheets at 105° for one hour, the data were: dry, 19.8 lbs. (152% of control); wet, 6.08 lbs. (31% of dry).

What is claimed is:

1. A prepolymer which is the reaction product of (a) an essentially monomeric adduct of at least two molar proportions of an epihalohydrin per molar proportion of an amine having at least 1 primary amino nitrogen and from 2 to 8 amino hydrogens, and (b) an amine having at least 2 amino hydrogens, the amine used in preparing said adduct (a) and the amine (b) each having a formula selected from the group consisting of (I)

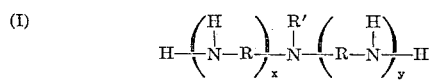

and (II)

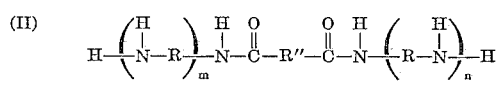

wherein each R denotes a bivalent alkylene group having from 2 to 6 carbon atoms, R' is selected from the group consisting of hydrogen, lower alkyl radicals having from 1 to 6 carbon atoms, and lower alkyl-containing acyl radicals having from 1 to 6 carbon atoms, $x$ and $y$ are integers of from 0 to 6, $x$ plus $y$ equal 1 to 6, R'' is a bivalent alkylene radical of from 2 to 8 carbon atoms, each of $m$ and $n$ is an integer of at least 1 and $m+n$ equals 2 to 4, the molar ratio of said adduct (a) to said amine (b) being such that the adduct (a) provides at least 3 haloalkanol equivalents, and the adduct (a) and the amine (b) provide at least 3 amino hydrogen equivalents for each combined total of from 6 to 14 haloalkanol and amino hydrogen equivalents.

2. A prepolymer as described in claim 1 wherein the amine used in preparing the adduct (a) and the amine (b) each have the Formula I.

3. A prepolymer, as described in claim 2, wherein the amine used in preparing the adduct (a) is diethylenetriamine, and the amine (b) is diethylenetriamine.

4. A prepolymer as described in claim 1 wherein the adduct (a) has the Formula I and the amine (b) has the Formula II.

5. A prepolymer as described in claim 4 wherein the amine used in preparing adduct (a) is dihexylenetriamine and the amine (b) is an amido amine obtained by reacting adipic acid with diethylenetriamine.

6. A prepolymer as described in claim 1 wherein the amine used in preparing adduct (a) and the amine (b) each have the Formula I.

7. A prepolymer as described in claim 6 wherein the amine used in preparing adduct (a) is an amido amine obtained by reacting sebacic acid with diethylenetriamine, and the amine (b) is obtained by reacting acetic acid with tetraethylenepentamine.

8. A prepolymer as described in claim 1 wherein the amine used in preparing the adduct (a) has the Formula II and the amine (b) has the Formula I.

9. A process for preparing an organic nitrogen containing prepolymer which comprises contacting and reacting (a) an essentially monomeric adduct of at least two molar proportions of an epihalohydrin per molar proportion of an amine having at least 1 primary amino nitrogen and from 2 to 8 amino hydrogens, and (b) an amine having at least 2 amino hydrogens, the amine used in preparing said adduct (a) and the amine (b) each having a formula selected from the group consisting of (I)

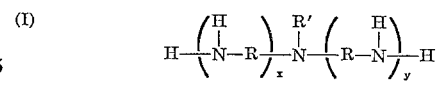

and (II) 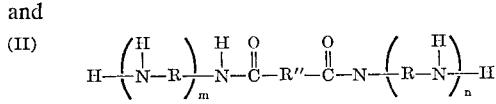

wherein each R denotes a bivalent alkylene group having from 2 to 6 carbon atoms, R' is selected from the group consisting of hydrogen, lower alkyl radicals having from 1 to 6 carbon atoms, and lower alkyl containing acyl radicals having from 1 to 6 carbon atoms, $x$ and $y$ are integers of from 0 to 6, $x$ plus $y$ equal 1 to 6, R" is a bivalent alkylene radical of from 2 to 8 carbon atoms, each of $m$ and $n$ is an integer of at least 1, and $m+n$ equals 2 to 4, the molar ratio of said adduct (a) to said amine (b) being such that the adduct (a) provides at least 3 haloalkanol equivalents, and the adduct (a) and the amine (b) provide at least 3 amino hydrogen equivalents for each combined total of from 6 to 14 haloalkanol and amino hydrogen equivalents, at a temperature of from 20° C. to 80° C. for from 0.5 to 100 hours.

10. A process according to claim 9 wherein the amine used in preparing the adduct (a) and the amine (b) each have the Formula I.

11. A process according to claim 10 wherein the amine used in preparing the adduct (a) and the amine (b) is diethylenetriamine.

12. A process according to claim 9 wherein the amine used to prepare the adduct (a) has the Formula I and the amine (b) has the Formula II.

13. A process according to claim 12 wherein the amine used in preparing the adduct (a) is dihexylenetriamine and the amine (b) is an amidoamine obtained by reacting adipic acid with diethylenetriamine.

14. A process according to claim 9 wherein the amine used in preparing adduct (a) has the Formula II, and the amine (b) has the Formula I.

15. A polysaccharide material treated with a minor amount ranging from 0.1 to 5% based on the weight of the dry polysaccharide of the prepolymer of claim 1.

16. A paper product treated with a minor amount ranging from 0.1 to 5% based on the weight of the dry paper of the prepolymer of claim 1.

17. A method for improving the wet and dry strength and dimensional stability characteristics of cellulosic paper which comprises adding to the aqueous pulp which is to be used to make said paper a minor amount of (a) an essentially monomeric adduct of at least two molar proportions of an epihalohydrin and an amine having at least 1 primary amino nitrogen and from 2 to 8 amino hydrogens, and (b) an amine having at least 2 amino hydrogens, the amine used in preparing said adduct (a) and the amine (b) each having a formula selected from the group consisting of (I) 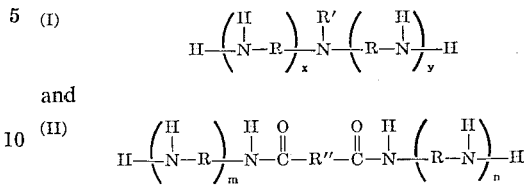

and (II) H—(N—R)_m—N—C—R"—C—N—(R—N)_n—H wherein each R denotes a bivalent alkylene group having from 2 to 6 carbon atoms, R' is selected from the group consisting of hydrogen, lower alkyl radicals having from 1 to 6 carbon atoms, and lower alkyl-containing acyl radicals having from 1 to 6 carbon atoms, $x$ and $y$ are integers of from 0 to 6, $x$ plus $y$ equal 1 to 6, R" is a bivalent alkylene radical of from 2 to 8 carbon atoms, each of $m$ and $n$ is an integer of at least 1, and $m+n$ equals 2 to 4, the molar of adduct (a) to said amine (b) being such that the adduct (a) provides at least 3 haloalkanol equivalents, and the adduct (a) and the amine (b) provide at least 3 amino hydrogen equivalents for each combined total of from 6 to 14 haloalkanols and amino hydrogen equivalents.

18. A method of improving the wet and dry strength and dimensional stability of cellulosic paper which comprises adding to an aqueous pulp which is to be used in making said paper a minor amount of a prepolymer composition as described in claim 1, and then forming paper from the resulting pulp composition.

19. A method of improving the wet and dry strength and dimensional stability of cellulosic paper which comprises adding to an aqueous pulp which is to be used in making said paper a minor amount of a prepolymer composition as described in claim 3.

References Cited by the Examiner

UNITED STATES PATENTS

| | | | |
|---|---|---|---|
| 2,595,935 | 5/1952 | Daniel et al. | 162—164 |
| 2,742,453 | 4/1956 | Auten | 260—2 |
| 2,926,154 | 2/1960 | Keim | 162—164 |
| 2,938,004 | 5/1960 | De Hoff et al. | 260—2 |

DONALL H. SYLVESTER, *Primary Examiner.*

MORRIS O. WOLK, WILLIAM B. KNIGHT, *Examiners.*